(12) United States Patent
Bartolutti et al.

(10) Patent No.: US 6,222,908 B1
(45) Date of Patent: Apr. 24, 2001

(54) METHOD AND DEVICE FOR IDENTIFYING A SPECIFIC PATCH CORD CONNECTOR AS IT IS INTRODUCED INTO, OR REMOVED FROM, A TELECOMMUNICATIONS PATCH SYSTEM

(75) Inventors: Steven Craig Bartolutti, Suwanee, GA (US); Golam Mabud Choudhury, Warren Township, NJ (US); Lyndon Dee Ensz, Nebraska, NE (US); Michael Gregory German, Secaucus, NJ (US); Daniel Warren Macauley, Fishers, IN (US); Lawrence Marc Paul, Randolph, NJ (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/404,420

(22) Filed: Sep. 23, 1999

(51) Int. Cl.[7] .................................................. H04M 1/24

(52) U.S. Cl. .............................. 379/27; 379/25; 379/156; 379/327; 340/825.36; 348/552

(58) Field of Search .................................. 379/24, 25, 26, 379/27, 28, 29, 32, 156, 160, 164, 166, 165, 343, 397, 399, 423, 325, 326, 327; 340/815.47, 815.48, 815.49, 815.5, 815.53, 815.54, 815.44, 825.21, 825.36; 348/552

(56) References Cited

U.S. PATENT DOCUMENTS

| | | | |
|---|---|---|---|
| 3,573,792 | * 4/1971 | Reed | 340/339 |
| 4,018,997 | * 4/1977 | Hoover et al. | 379/165 |
| 4,096,359 | * 6/1978 | Barsellotti | 379/165 |
| 4,140,885 | * 2/1979 | Verhagen | 379/165 |
| 5,550,755 | * 8/1996 | Martin et al. | 340/825.36 |
| 5,727,055 | * 3/1998 | Ivie et al. | 379/156 |
| 5,832,071 | * 11/1998 | Voelker | 379/165 |

* cited by examiner

Primary Examiner—Curtis A. Kuntz
Assistant Examiner—Binh K. Tieu
(74) Attorney, Agent, or Firm—Gibbons, Del Deo, Dolan, Griffinger & Vecchione

(57) ABSTRACT

A system having a plurality of patch cords, wherein each of the patch cord is terminated with patch cord connectors. Each of the patch cord connectors, in turn, contains a unique identifier that can be used to distinguish one patch cord from among the many patch cords in a telecommunication patch system. Within the telecommunications closet is at least one rack structure. A plurality of connector ports are disposed on the rack structure. Each of said connector ports is adapted to receive a patch cord connector. Each of the connector ports has a sensor that reads the unique identifier of any of the patch cord connectors as a patch cord connector is either inserted into, or removed from, a connector port. As the identifier on each patch cord connector is read, the overall system can automatically keep track of which specific patch cords are being added and removed from the system.

20 Claims, 4 Drawing Sheets

METHOD AND DEVICE FOR IDENTIFYING A SPECIFIC PATCH CORD CONNECTOR AS IT IS INTRODUCED INTO, OR REMOVED FROM, A TELECOMMUNICATIONS PATCH SYSTEM

RELATED APPLICATIONS

This application is related to the following co-pending applications, the disclosures of which are incorporated into this specification by reference.

U.S. patent application Ser. No. 09/247,613, entitled SYSTEM AND METHOD FOR ADDRESSING AND TRACING PATCH CORDS IN A DEDICATED TELECOMMUNICATIONS SYSTEM (German 15-12-6-6);

U.S. patent application Ser. No. 09/247,614, entitled SYSTEM AND METHOD OF OPERATION FOR A TELECOMMUNICATIONS PATCH SYSTEM (Bartolutti 3-13-19-10-8);

U.S. patent application Ser. No. 09/247,269, entitled TRACING INTERFACE MODULE FOR PATCH CORDS IN A TELECOMMUNICATIONS PATCH SYSTEM (Ensz 10-1-14-5);

U.S. patent application Ser. No. 09/247,385, entitled DISPLAY PANEL OVERLAY STRUCTURE AND METHOD FOR TRACING INTERFACE MODULES IN A TELECOMMUNICATIONS PATCH SYSTEM (Bloch 3-12-12-18-9);

U.S. patent application Ser. No. 09/247,237, entitled METHOD AND DEVICE FOR DETECTING THE PRESENCE OF A PATCH CORD CONNECTOR IN A TELECOMMUNICATIONS PATCHING SYSTEM USING PASSIVE DETECTION SENSORS (Bartolutti 1-10-11-16-7-7); and U.S. patent application Ser. No. 09/247,270, entitled METHOD AND DEVICE FOR DETECTING THE PRESENCE OF A PATCH CORD CONNECTOR IN A TELECOMMUNICATIONS PATCH SYSTEM (Bartolutti 2-11-17-8).

BACKGROUND OF THE INVENTION

1. Field of the Invention

In general, the present invention relates to telecommunications patching systems that are used to selectively interconnect different telecommunications lines to one another using patch cords. More particularly, the present invention relates to telecommunication patching systems that embody patch cord identification capabilities that help a technician identify a specific patch cord within the system.

2. Description of the Prior Art

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunications line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or an RJ-11 telecommunications connector. One end of the patch cord 20 is connected to the connector port 16 of a first telecommunications line and the opposite end of the cord is connected to the connector port 16 of a second telecommunications line. By selectively connecting the various lines with the patch cords 20, any combination of telecommunications lines can be interconnected.

In many businesses, employees are assigned their own computer network access number exchange so that the employee can interface with the company's main frame computer or computer network. When an employee moves offices, it is not desirable to provide that employee with newly addressed telecommunication connection ports. Rather, to preserve consistency in communications, it is preferred that the exchanges of the telecommunication connection ports in the employee's old office be transferred to the telecommunications ports in the employee's new office. To accomplish this task, the patch cords in the telecommunication closet are rearranged so that the employee's old exchanges are now received in his/her new office.

As employees move, change positions, add lines and subtract lines, the patch cords in a typical telecommunications closet are rearranged quite often. The interconnections of the various patch cords in a telecommunications closet are often logged in either paper or a computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that technician manually traces that patch cord between two connector ports. To perform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidently go from one patch cord to another during a manual trace. Such errors result in misconnected telecommunication lines which must be later identified and corrected.

In order to improve existing patch cord tracing systems, a need exists for an automated system that will identify a patch cord as that patch cord is removed from, or added to, a rack in the telecommunications closet. By identifying the patch cord, the system can tell if the opposite ends of the same patch cord are being properly selected by a technician.

SUMMARY OF THE INVENTION

The present invention is part of a patch cord identification and tracing system used to identify and trace patch cords that are used in a telecommunications patching closet. The system includes a plurality of patch cords, wherein each of the patch cord is terminated with patch cord connectors. Each of the patch cord connectors, in turn, contains a unique identifier that can be used to distinguish one patch cord from among the many patch cords in the system.

Within the telecommunications closet is at least one rack structure. A plurality of connector ports are disposed on the rack structure. Each of the connector ports is adapted to receive a patch cord connector. Additionally, each of the connector ports has a sensor that reads the unique identifier of any of the patch cord connectors as a patch cord connector is either inserted into, or removed from, a connector port. As the identifier on each patch cord connector is read, the overall system can automatically keep track of which specific patch cords are being added and removed from the system.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
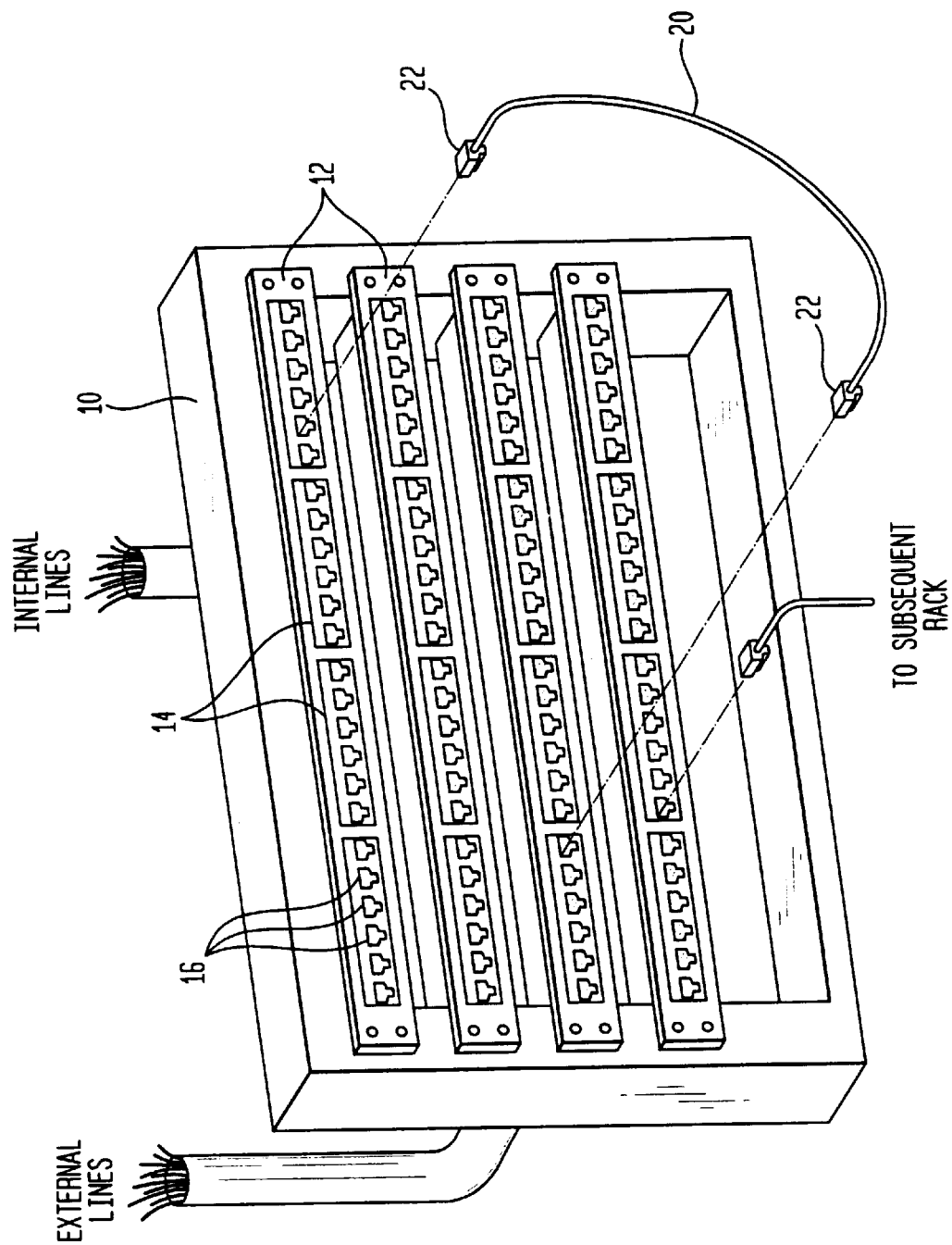
FIG. 1 is a perspective view of a typical prior art telecommunications rack assembly containing multiple patch panels with connector ports that are selectively interconnected by patch cords.
Figure 2:
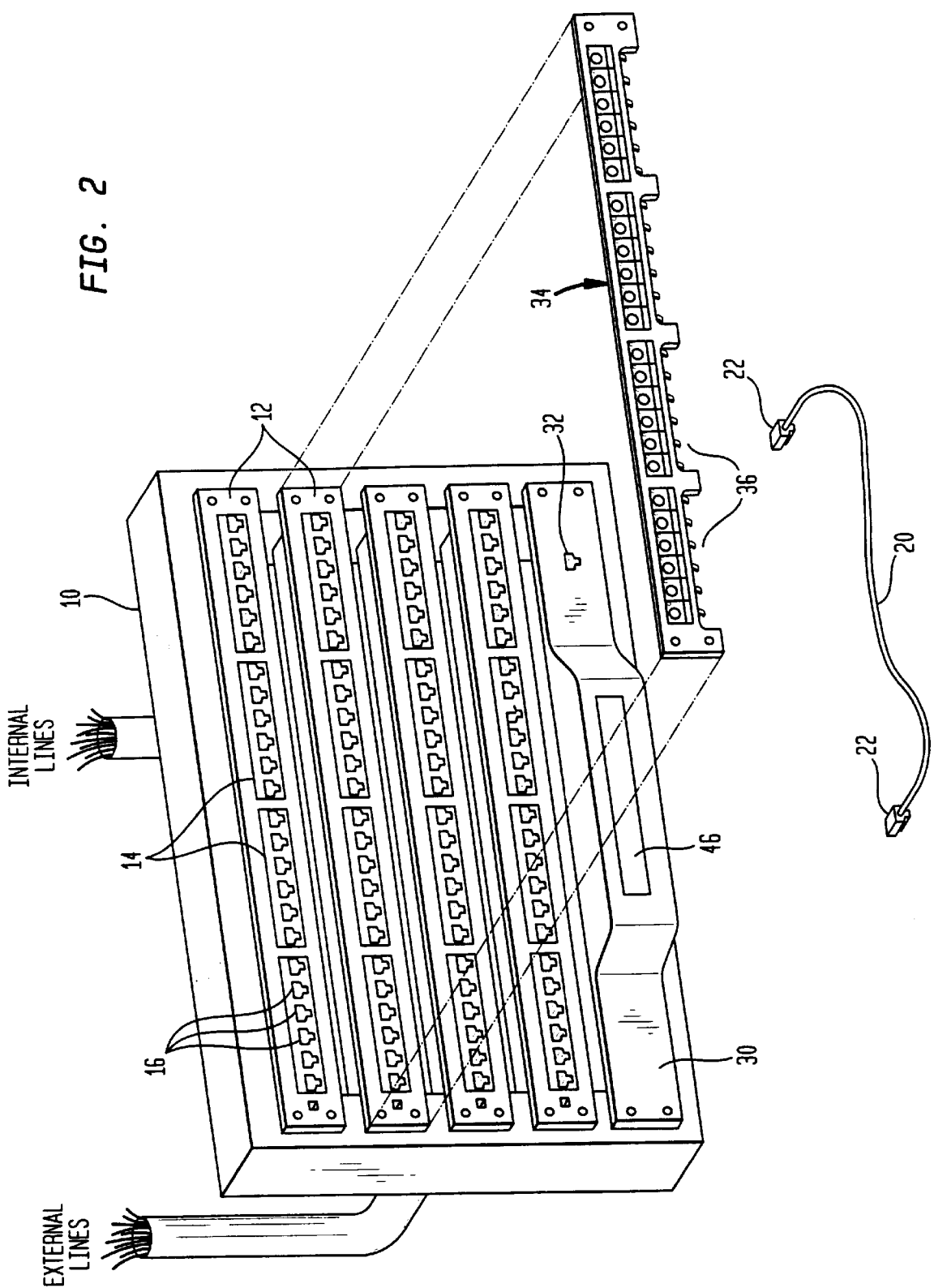
FIG. 2 is a perspective view of a tracing interface module and rack controller in accordance with the present invention, shown in conjunction with the prior art telecommunications rack assembly of FIG. 1.

Referring to FIG. 2, a conventional telecommunications rack 10 is shown, such as the one previously described in regard to FIG. 1. The telecommunications rack 10 contains a plurality of patch panels 12 that are mounted in parallel horizontal rows within the rack 10. Each of the patch panels 12 contains a plurality of patch port assemblies 14. The connector ports 16 associated with each of the patch port assemblies 14 are hard wired to the various lines that enter the telecommunications closet.

In the present invention system, a rack controller 30 is mounted to each rack 10 in the overall patch system. The rack controller 30 contains a central processing unit (CPU). The CPU is capable of independently running various identification and tracing programs. The rack controller 30 also contains a remote access port 32 that enables the CPU to be accessed by a remote computer. The rack controllers 30 of different racks can be interconnected in a common network. Remote access of the rack controller and network connections of rack controllers are the subject of related co-pending patent application Ser. No. 09/247,614, entitled System and Method of Operation for a Telecommunications Patch System, which has been incorporated into this application by reference.

The purpose of the rack controller 30 is to operate and gather data from the various tracing interface modules 34, as will be later explained. The tracing interface modules 34 are modules that mount to the face of each patch panel 12 on the rack 10. The tracing interface modules 34 surround the various connector ports 16 located on a patch panel 12 and provide an interface through which data about each connector port 16 or patch cord 20 can be transmitted to and from the rack controller 30.

The tracing interface module 34 can have multiple configurations. The structure and different configurations of the tracing modules are disclosed in related co-pending patent application Ser. No. 09/247,269, entitled Tracing Interface Module For Patch Cords in a Telecommunications Patch System; patent application Ser. No. 09/247,385, entitled Display Panel Overlay Structure and Method For Tracing Interface Modules in a Telecommunications System; and patent application Ser. No. 09/247,270, entitled Method and Device For Detecting the Presence of a Patch Cord Connector in a Telecommunications Patch System. These applications have already been incorporated into this application by reference.

In the shown embodiment, the tracing interface module 34 contains a rectangular relief 36 that surrounds the connector ports 16 on each patch port assembly 14 when the tracing interface module 34 is connected to the patch panel 12. As the terminated end connector 22 of a patch cord 20 is connected to a connector port 16, the patch cord connector 22 passes through a rectangular relief 36 in close proximity to the structure of the tracing interface module 34.

Figure 3:
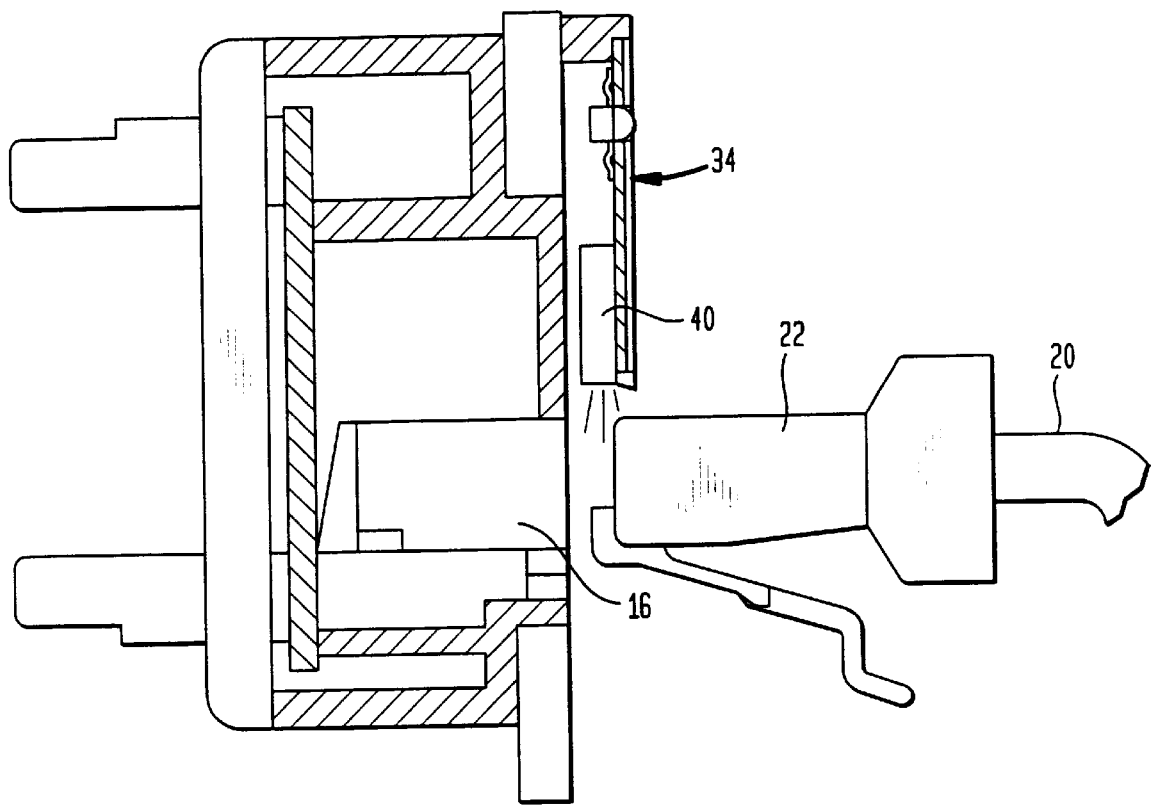
FIG. 3 is a cross-sectional view of a tracing interface module attached to a prior art patch panel.

Referring to FIG. 3, it can be seen that a sensor 40 is located within the structure of the tracing interface module 34. The sensors 40 are positioned so as to be located directly above each of the connector ports 16 on the various racks 12 (FIG. 2). As a patch cord connector 22 passes into a connector port 16, the patch cord connector 22 passes directly below one of the sensors 40.

Figure 4:
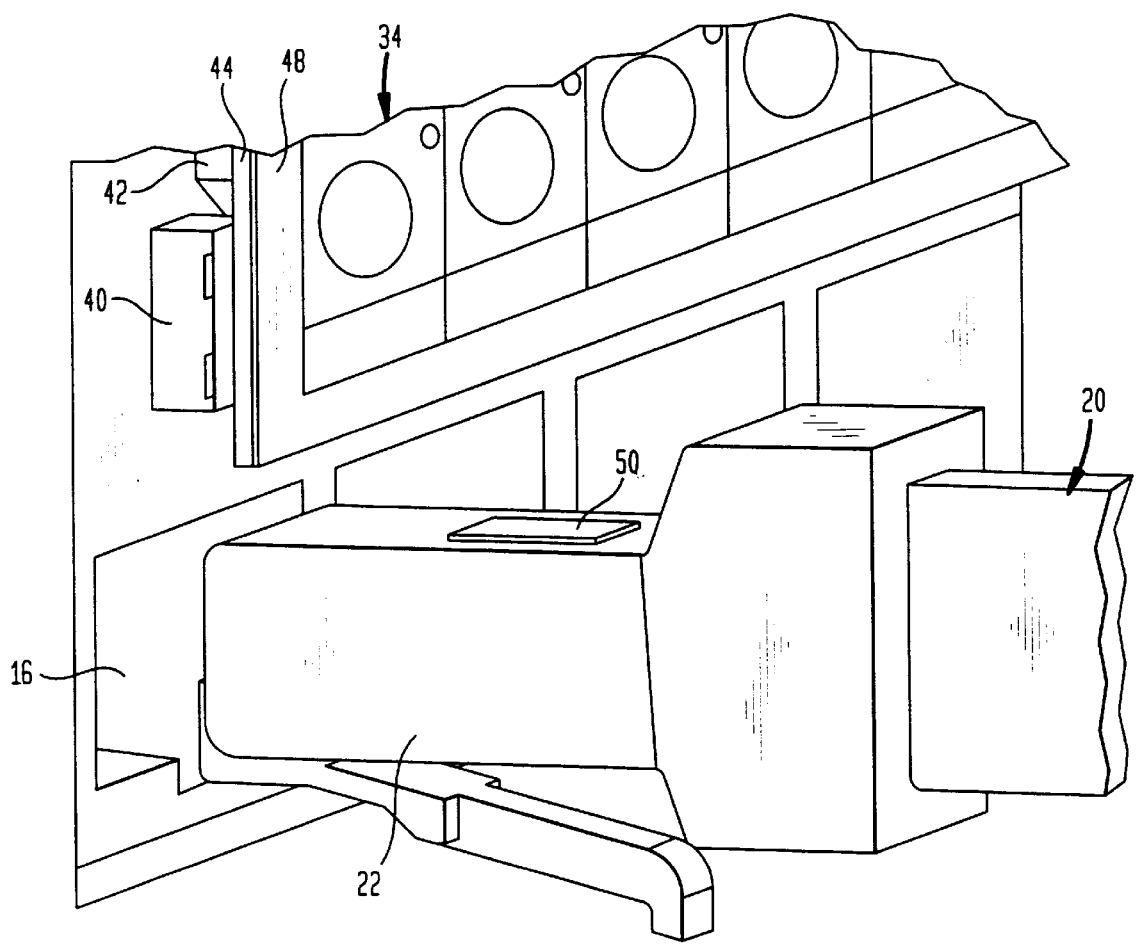
FIG. 4 is an enlarged, fragmented, view of a section of a tracing interface module attached to a prior art patch panel.

Referring to FIG. 4, it can be seen that each of the patch cord connectors has a unique identifier 50 within the system. The identifier passes directly below the sensor 40 as the patch cord connector 22 is inserted into the connector port 16. The sensor 40 on the tracing interface module 34 and the identifier 50 have matched technologies. For example, the identifier 50 can be a UPC  bar code  or the newer  Data Matrix  code. In such a case, the sensor 40 would be a bar code or Data Matrix code reader. Alternatively, the identifier 50 can be a magnetic medium, wherein the sensor 40 would be a magnetic head that reads the magnetic medium. In other embodiments, the identifier 50 can be data recorded in an optical medium, or a microchip can be placed on the patch cord connector 22 that contains a unique identifier code. If the identifier 50 is recorded in an optical medium, the sensor 40 would contain a laser reader for reading the optical medium. Similarly, if the identifier 50 were a microchip, the sensor 40 would be an electronic circuit that interconnects with the microchip when the patch cord connector 22 is inserted into the connector port 16.

Each sensor 40, regardless of its configuration, is monitored by the rack controller 30 (FIG. 2). The rack controller is therefore capable of automatically determining the identity of a specific patch cord connector 22 when that patch cord connector 22 has been added to, or removed from, any connector port 16 on the rack due to the unique identifier on the patch cord connector 22 and the ability of the corresponding sensor 40. The rack controller is therefore capable of monitoring the identity of any and all patch cords that are connected to, or disconnected from, the patch system over time. The rack controller therefore is capable of automatically keeping an accurate log of all changes that have occurred to the patch cords 20 since the installation of the present invention system. Furthermore, the system controller can indicate when a technician has disconnected the ends of two different patch cords rather than the two ends of the same patch cord.

If a technician is servicing the patch system, that technician can read the accurate log or any alarms straight from the rack controller. The log can be read out on the display 46 (FIG. 2) on the rack controller 30 or can be remotely accessed via the external connector port 32 (FIG. 2) on the rack controller 30.

By positioning the sensors 40 within the structure of the tracing interface module 34 (shown in FIG. 4), the sensors can be retroactively added to many existing telecommunication patch systems. The tracing interface module 34 is comprised of a support frame 42, a printed circuit board 44 and a graphics overlay 48. The support frame 42 is a molded element that provides rigidity to the printed circuit board 44 and the graphics overlay 48. The sensors 40 are attached to the printed circuit board 44. A complete description of the structure of components comprising the tracing interface module 34 is disclosed in co-pending patent application Ser. No. 09/247,269, entitled, TRACING INTERFACE MODULE FOR PATCH CORDS IN A TELECOMMUNICATIONS PATCH SYSTEM, which has already been incorporated into this specification by reference.

Although a patch cord identification system can be retroactively added to existing telecommunications patch system by utilizing trace interface modules 34, new telecommunications patch systems can be manufactured with integral tracing capabilities. In such a new design, the features of the previously described tracing interface module 34 (FIG. 2) can be incorporated into the design of the patch port assemblies 14 (FIG. 2) present on the patch panel 12 (FIG. 2).

Figure 5:
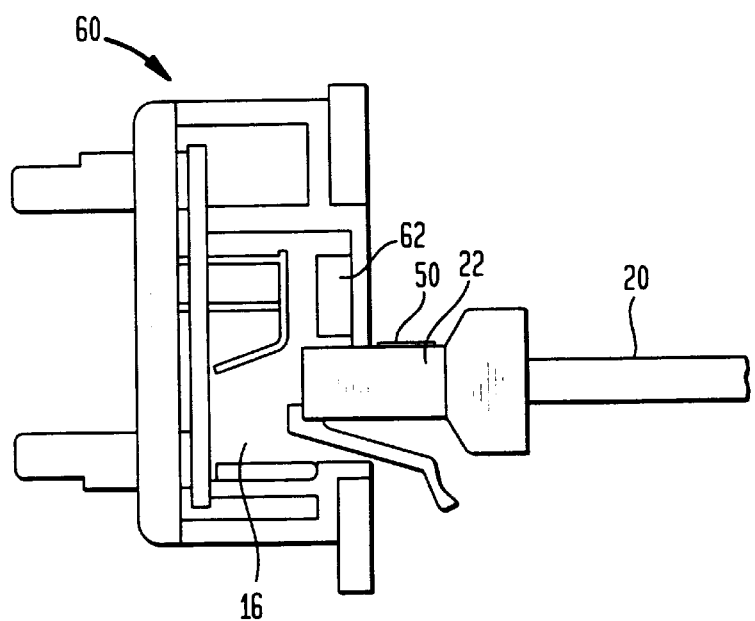
FIG. 5 is a cross-sectional view of a patch port assembly having an internal sensor.

Referring to FIG. 5, an exemplary patch port assembly 60 is shown that contains an internal sensor 62. As the patch cord connector 22 is inserted into the connector port 16, the patch cord connector 22 passes across the sensor 62. This provides the sensor 62 with the opportunity to read information from the identifier 50 that is located on the exterior of the patch cord connector 22.

As the patch cord connector 22 is inserted into the connector port 16, the identifier 50 moves past the sensor 62. Similarly, as the patch cord connector 22 is removed from the connector port 16, the identifier 50 moves past sensor 62. In both circumstances, the sensor 62 is provided with the opportunity to read the identifier 50. Accordingly, each time a patch cord connector 22 is either added to, or removed from, the connector port 16, the patch cord connector 22 can be positively identified.

It will be understood that the embodiments of the present invention specifically shown and described are merely exemplary and that a person skilled in the art can make alternate embodiments using different configurations and functionally equivalent components. For example, there can be many different types and locations of sensors used to identify the patch cord connectors other than the few that are specifically described and referenced. All such alternate embodiments are intended to be included in the scope of this invention as set forth in the following claims.

What is claimed is:

1. A telecommunications system, comprising:
   at least one rack structure:
   a plurality of patch panels mounted to each said rack structure;
   a plurality of connector ports disposed on each of said patch panels;
   a plurality of patch cords for selectively interconnecting different pairs of connector ports, each of said patch cords being terminated with patch cord connectors, wherein each of said patch cord connectors contains a unique identifier; and
   modules mounted to said patch panels above said connector ports, wherein said modules contain sensors that read the unique identifier on each of said patch cord connectors when said patch cord connectors are either connected to, or removed from, said connector ports.

2. The system according to claim 1, further including a controller on each said rack structure that is coupled to each of said sensors in said modules.

3. The system according to claim 1, wherein said identifier on each of said patch cord connectors is selected from a group consisting of bar codes, Data Matrix codes, recorded magnetic media, recorded optical media, and electronic circuitry.

4. The system according to claim 3, wherein said sensors selected from a group consisting of bar code readers, Data Matrix code readers, magnetic medium readers, optical medium readers and electronic circuit interfaces.

5. A telecommunications patching system, comprising:
   a plurality of patch cords, wherein each of said patch cord is terminated with patch cord connectors having a unique identifier;
   at least one rack structure; and
   a plurality of connector ports disposed on said rack structure, each of said connector ports being adapted to receive a patch cord connector, wherein each of said connector ports has a sensor that senses the unique identifier of one of said patch cord connectors each time that patch cord connector is either inserted into or removed from a connector port.

6. The system according to claim 5, wherein said sensors are disposed with said connector ports within said at least one rack structure.

7. The system according to claim 5, wherein said sensors are attached to said at least one rack structure at points external of said connector ports.

8. The system according to claim 5, further including a controller on each said rack structure that is coupled to each of said sensors.

9. The system according to claim 5, wherein said identifier on each of said patch cord connectors is selected from a group consisting of bar codes, Data Matrix codes, recorded magnetic media, recorded optical media, and electronic circuitry.

10. The system according to claim 9, wherein said sensors selected from a group consisting of bar code readers, Data Matrix code readers, magnetic medium readers, optical medium readers and electronic circuit interfaces.

11. A method of identifying specific patch cord connectors of patch cords used within a telecommunications closet as the patch cord connectors are both added to, and removed from, connector ports within the telecommunications closet, said method comprising the steps of:

provide a unique identifier on the patch cord connectors of patch cords used within the telecommunications closet; and providing a sensor proximate each of the connector ports in the telecommunications closet, wherein each sensor reads the unique identifier on the patch cord connector and identifies that patch cord connector as the patch cord connector is moved past that sensor.

12. The method according to claim 11, wherein said step of providing a sensor, includes positioning a sensor at a point external to each of the connector ports.

13. The method according to claim 11, wherein said step of providing a sensor includes internally positioning a sensor within each connector port.

14. The method according to claim 11, wherein said step of providing a sensor includes the step of attaching a module in front of each connector port, wherein each said sensor is contained within said module.

15. The method according to claim 11, wherein said identifier is bar code and said sensor is a bar code reader that reads said bar code as said bar code is passed over said bar code reader.

16. The method according to claim 11, wherein said identifier is a data containing magnetic medium and said sensor is a head that reads data recorded on said magnetic medium.

17. The method according to claim 11, wherein said identifier is a data containing optical medium and said sensor is a laser reader that reads data recorded on said optical medium.

18. The method according to claim 11, wherein said identifier is a microchip with an embedded identification code and said sensor is a circuit that engages the microchip and electronically reads said identification code.

19. The method according to claim 15, wherein said identifier is Data Matrix code and said sensor is a Data Matrix code reader that reads said Data Matrix code as said Data Matrix code is passed over said Data Matrix code reader.

20. The transmission system according to claim 1, wherein said patch panels, connector ports and patch cords are installed and made operational; and said indicators and modules are added subsequently, during operation of said patch panels, connector ports and patch cords.

* * * * *